US011436756B2

(12) United States Patent
Fitzgibbon et al.

(10) Patent No.: US 11,436,756 B2
(45) Date of Patent: Sep. 6, 2022

(54) CALIBRATING A MACHINE VISION CAMERA

(71) Applicant: Microsoft Technology Licensing, LLC, Redmond, WA (US)

(72) Inventors: Andrew William Fitzgibbon, Cambridge (GB); Taras Khapko, Belgrade (RS); Vuk Jovanovic, Belgrade (RS); Filip Panjevic, Belgrade (RS); Vladimir Carapic, Belgrade (RS); Jelena Mojasevic, Belgrade (RS)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/228,688

(22) Filed: Dec. 20, 2018

(65) Prior Publication Data
US 2020/0202567 A1 Jun. 25, 2020

(51) Int. Cl.
G06T 7/80 (2017.01)
G06T 7/73 (2017.01)

(52) U.S. Cl.
CPC . G06T 7/80 (2017.01); G06T 7/73 (2017.01)

(58) Field of Classification Search
CPC .................................. G06T 7/73; G06T 7/80
See application file for complete search history.

(56) References Cited

U.S. PATENT DOCUMENTS

| 2013/0329957 | A1* | 12/2013 | Ebisawa | ................ | A61B 3/113 382/103 |
| 2016/0080737 | A1* | 3/2016 | Tezaur | ....................... | G06T 7/80 348/188 |
| 2016/0189358 | A1* | 6/2016 | Boufarguine | ............. | G06T 7/80 348/50 |
| 2018/0061056 | A1* | 3/2018 | Zhao | ..................... | G06K 9/2036 |
| 2019/0043219 | A1* | 2/2019 | Tezaur | ............... | H04N 5/23238 |

(Continued)

OTHER PUBLICATIONS

Beck, et al., "Generalized B-spline Camera Model", In Proceedings of IEEE Intelligent Vehicles Symposium, Jun. 26, 2018, pp. 2137-2142.

(Continued)

Primary Examiner — Lixi C Simpson
(74) Attorney, Agent, or Firm — Alleman Hall Creasman & Tuttle LLP

(57) ABSTRACT

Examples are disclosed that relate to a camera model for a machine vision application. One example provides instructions executable to receive image data obtained by an image sensor of a camera, the image data capturing a calibration pattern comprising a plurality of calibration features, for each of one or more imaged calibration features in the image data, determine an object space location of the imaged calibration feature, and determine a distance between the object space location and a corresponding ray of a camera model, the camera model defining a plurality of rays that each represent a relationship of an image space location on the image sensor to object space. The instructions are further executable to determine a value of a cost function based on the distances, adjust the camera model until the cost function meets a target condition, and use the camera model in a machine vision application.

20 Claims, 6 Drawing Sheets

(56) References Cited

U.S. PATENT DOCUMENTS

2019/0073792 A1\* 3/2019 Fletcher .................. G06T 7/74

OTHER PUBLICATIONS

Miraldo, et al., "Calibration of Smooth Camera Models", In Journal of Transactions on Pattern Analysis and Machine Intelligence, vol. 35, Issue 9, Sep. 2013, pp. 2091-2103.
"International Search Report Issued in PCT Application No. PCT/US19/066109", dated Feb. 21, 2020, 11 Pages.
Ramalingam, et al., "A Unifying Model for Camera Calibration", In Journal of Transactions On Pattern Analysis And Machine Intelligence, vol. 39, Issue 7, Jul. 1, 2017, pp. 1309-1319.
Rosebrock, et al., "Complete Generic Camera Calibration and Modeling Using Spline Surfaces", In Proceedings of Asian Conference on Computer Vision, Nov. 5, 2012, pp. 488-498.
Rosebrock, et al., "Generic Camera Calibration and Modeling using Spline Surfaces", In Proceedings of IEEE Intelligent Vehicles Symposium, Jun. 3, 2012, pp. 51-56.
Newcombe, et al., "KinectFusion: Real-Time Dense Surface Mapping and Tracking", In Proceedings of 10th IEEE International Symposium on Mixed and Augmented Reality, Oct. 26, 2011, pp. 127-136.
Szeliski, Richard, "Computer Vision: Algorithms and Applications", In Publication of Springer, Sep. 3, 2010, 979 Pages.

\* cited by examiner

CALIBRATING A MACHINE VISION CAMERA

BACKGROUND

Machine vision may be used by computing devices for a wide variety of applications. As an example, a computing device may utilize machine vision to perform eye tracking as a user input mechanism.

SUMMARY

Examples are disclosed that relate to a calibrating a camera for machine vision. One example provides a computing device comprising instructions executable to receive image data obtained by an image sensor of a camera, the image data capturing a calibration pattern comprising a plurality of calibration features. The instructions are further executable to, for each of one or more imaged calibration features in the image data, determine an object space location of the imaged calibration feature, and determine a distance between the object space location and a corresponding ray of a camera model, the camera model defining a plurality of rays that each represent a relationship of an image space location on the image sensor to object space. The instructions are further executable to determine a value of a cost function based on the distance, adjust the camera model until the cost function meets a target condition, and use the camera model in a machine vision application.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
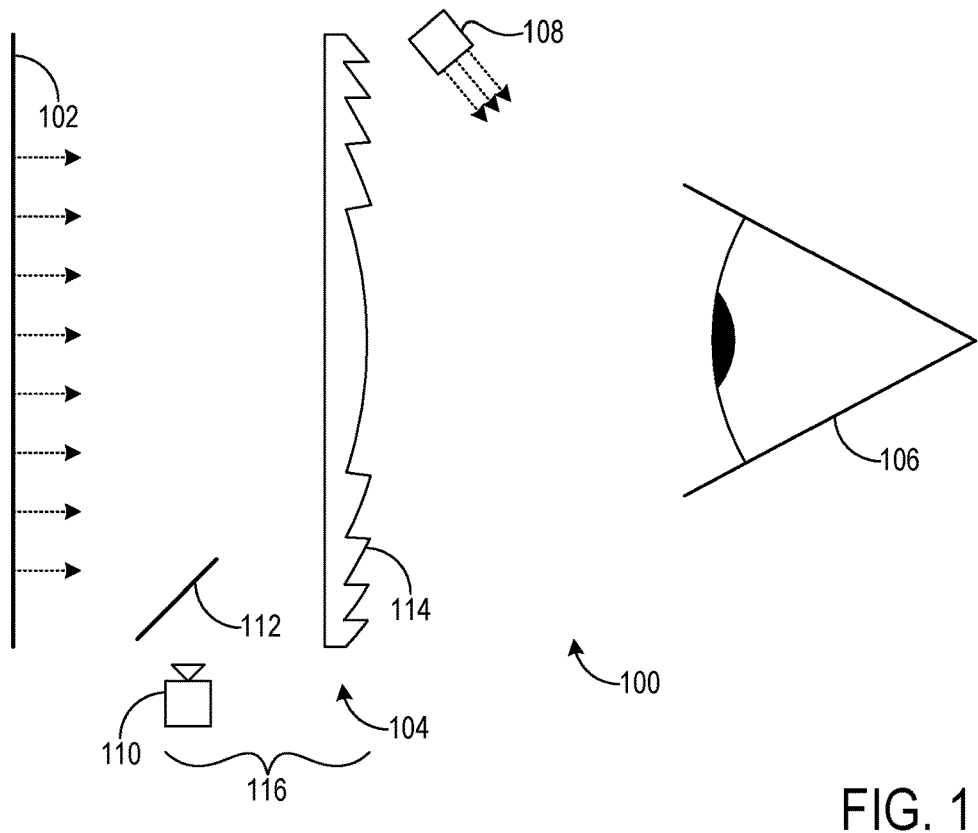
FIG. 1 schematically shows various aspects of a head-mounted display device comprising an eye-tracking camera.

FIG. 1A schematically shows various elements of an example HMD device 100. HMD device 100 includes a display 102 configured to output light that, when refracted by a lens system 104, forms imagery viewable by an eye 106 of a wearer of the HMD device. HMD device 100 also implements machine vision in the form of an eye-tracking system configured to determine the gaze direction of eye 106. To this end, a light source 108 is configured to output light that may be reflected from eye 106 toward an eye-tracking camera 110 to thereby obtain eye tracking image data. The gaze direction determined via image data obtained via eye-tracking camera 110 may be used as an input to a software application, to facilitate foveated rendering of graphical content on display 102, and/or for any other suitable purpose. While FIG. 1 depicts a single eye 106, HMD device 100 may produce viewable imagery, and/or perform eye tracking, for both eyes of the wearer.

To obtain a sufficiently wide view of eye 106, eye-tracking camera 110 is arranged behind lens system 104, which comprises a Fresnel lens. Light received by eye-tracking camera 110 is thus refracted through lens system 104, and subsequently reflected by a mirror 112 that redirects light toward the eye-tracking camera. Due to the positioning of eye-tracking camera 110, lens system 104 and eye-tracking camera 110 form a non-central optical system 116. As used herein, a "central" camera or optical system is one in which substantially all received rays converge at a single point, whereas a "non-central" camera or optical system is one in which received rays do not converge at a single point. In further contrast to central optical systems, non-central optical system 116 may exhibit varying types of projection (e.g. perspective, orthographic, magnifying) depending on the relative position of eye-tracking camera 110 and lens system 104 in non-central optical system 116. Lens types and optical elements other than Fresnel lens 114 also may lead to the formation of a non-central optical system for machine vision.

Figure 2:
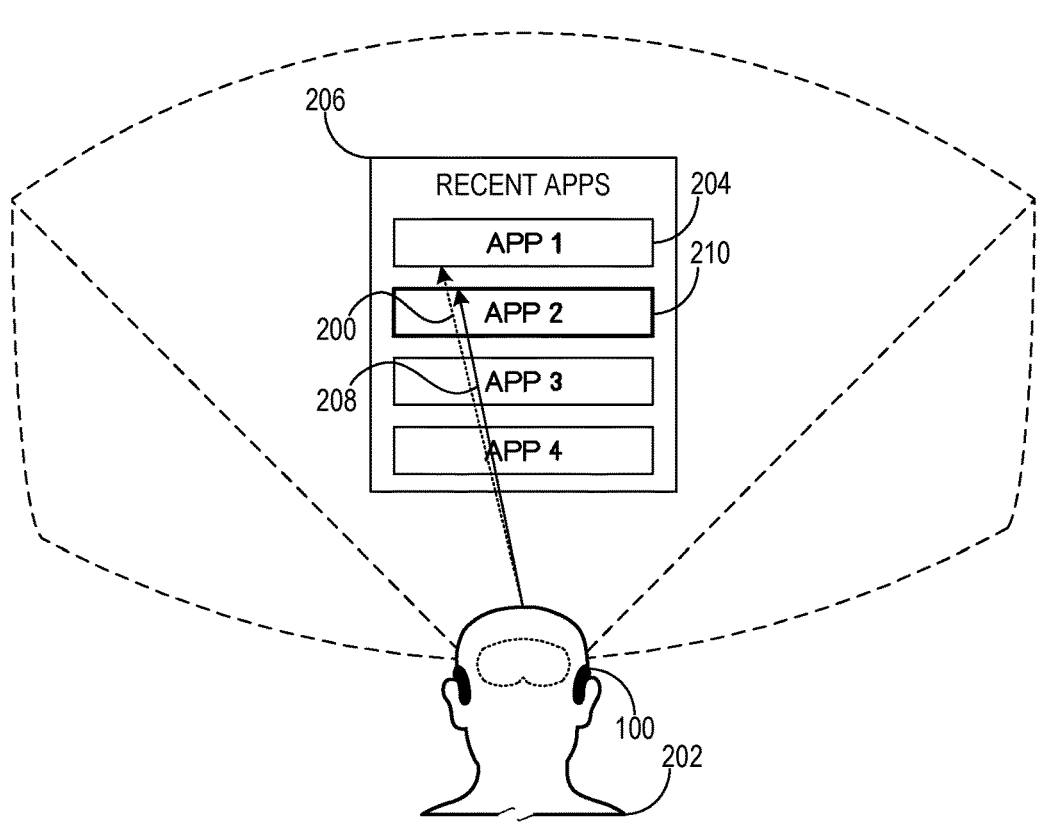
FIG. 2 illustrates an example scenario in which camera miscalibration results in a mismatch between a determined gaze direction and an actual gaze direction.

In order to achieve accurate eye-tracking in HMD device 100, a calibration procedure may be performed to calibrate eye-tracking camera 110. Camera calibration is the process of estimating internal (intrinsics) and external (extrinsics) camera parameters, with the goal of obtaining a mapping from the 2D camera image plane to 3D object space, and vice versa. However, calibration procedures configured for central optical systems may fail to properly calibrate a non-central camera, such as eye-tracking camera 110. FIG. 2 illustrates a potential result of such miscalibration. Here, image data obtained via eye-tracking camera 110 is used to compute a determined gaze direction 200 of a wearer 202 of HMD device 100. Determined gaze direction 200 intersects a control 204 displayed in a user interface 206, where the control corresponds to a first application. As such, the first application is subsequently executed on HMD device 100. However, the determined gaze direction 200 differs from an actual gaze direction 208 of wearer 202, which intersects a control 210 corresponding to a second application. Thus, due to the miscalibration, the action executed by the HMD device 100 does not match the intended user action.

In view of the above, examples are disclosed herein that may be used for calibrating both central and non-central optical systems. Briefly, in the disclosed examples, locations on an image sensor of a camera are mapped to corresponding rays that extend from the locations into physical space, thereby defining a camera model. In the disclosed example calibration procedures, the rays are fit to calibration features observed in object space via the camera. The resulting mapping may enable an accurate determination of the location in physical space from which image light received at an image sensor pixel originated. While described herein in the context of eye tracking, the disclosed examples may apply to other machine vision applications, including but not limited to object recognition, user identification, and unmanned vehicle navigation. As such, the disclosed examples are applicable to both HMD and non-HMD device contexts.

Figure 3:
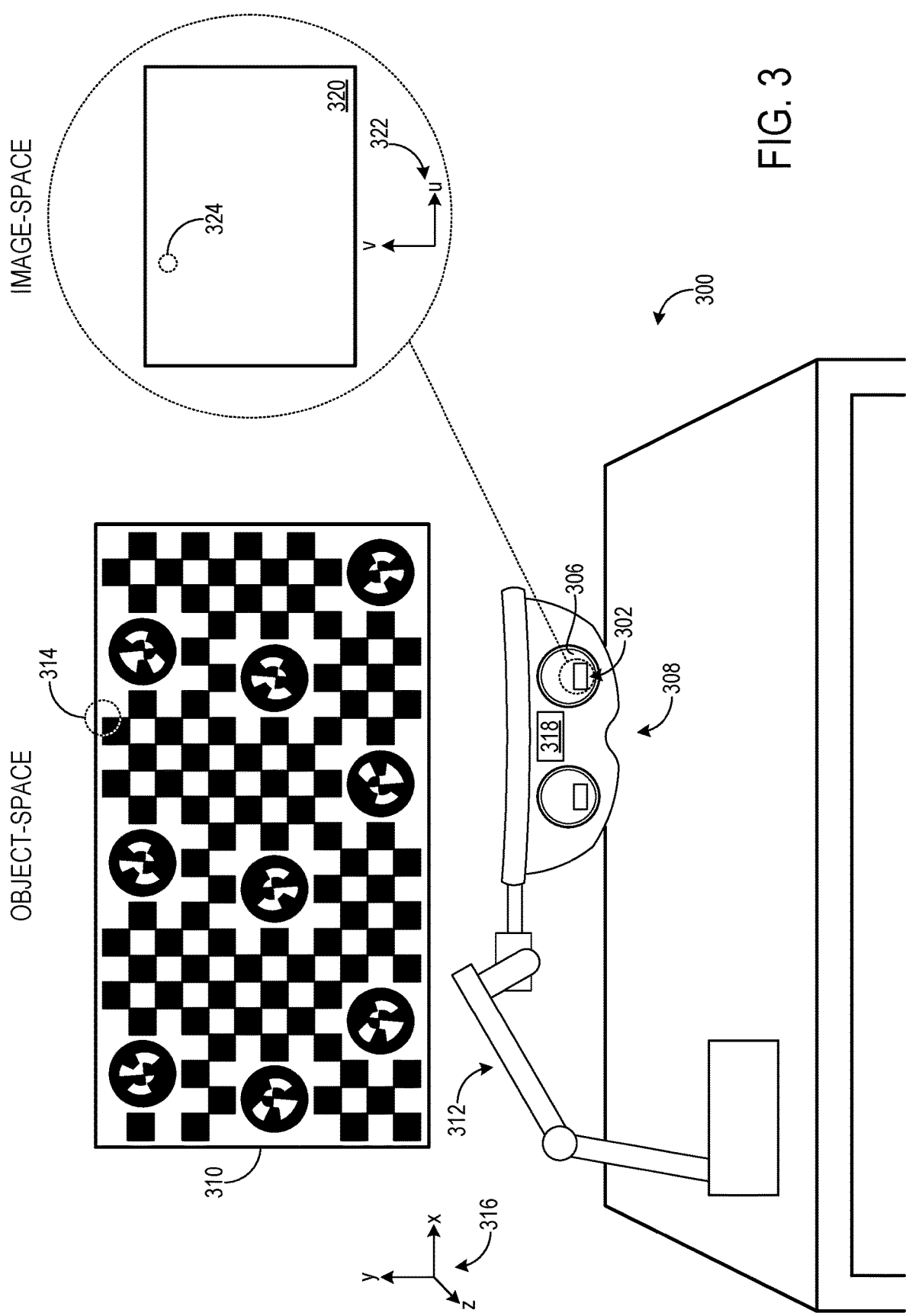
FIG. 3 shows an example calibration system for an eye-tracking camera.

FIG. 3 depicts an example environment 300 in which a camera calibration procedure is performed to calibrate an eye-tracking camera 302. Eye-tracking camera 302 is included in an HMD device 308 having a lens 306 (e.g. a Fresnel lens or other suitable lens). The eye-tracking camera 302 is positioned at a location offset from an optical axis of the lens 306 to receive light refracted through lens 306, resulting in a non-central imaging system. While not shown in FIG. 3, in some examples light refracted through lens 306 may be reflected by a mirror toward eye-tracking camera 302.

As described in more detail below, the calibration system illustrated in FIG. 3 is used to acquire image data to model a relationship between the locations on the image sensor of the eye-tracking camera 302 and corresponding locations in physical space. To facilitate this determination, eye-tracking camera 302 first obtains image data capturing a calibration pattern 310 that comprises a plurality of calibration features. In the depicted example, these calibration features take the form of corners (such as corner 314) and circles, but may take other forms in other examples. The image data obtained by eye-tracking camera 302 includes a plurality of image frames acquired while the eye-tracking camera and calibration pattern 310 are moved relative to one another (e.g. as the calibration pattern is moved in front of the eye-tracking camera and/or as the camera is moved in front of the calibration pattern).

From the acquired image data, locations of the calibration features in object space may be determined, wherein "object space" refers to a physical space that is imaged. In some examples, the object space locations of the imaged calibration features may be determined as part of the calibration of a camera model described below. In other examples, an additional camera arranged separately from eye-tracking camera 302 may be used to determine the object space locations of the calibration features by imaging calibration pattern 310 directly, without looking through the lens 306. In FIG. 3, a calibration camera 318 is used to determine these object space locations, which may allow calibration to be performed with fewer total frames of image data than where the calibration camera is not used and motion of the calibration pattern is not otherwise known, as fewer observations of calibration features are needed to calibrate the camera when motion of the calibration pattern relative to the eye tracking camera is known (see e.g. Ramalingam, S. and Sturm, P., A *Unifying Model for Camera Calibration*, IEEE Transactions on Pattern Analysis and Machine Intelligence 39, 7 (Jul. 1, 2017)). In other examples, for example when recalibrating due to damage or replacement of a part, calibration may be performed without such a camera by acquiring a greater number of observations of the calibration features per calibration process and solving for motion of the pattern, as described in Ramalingam, supra.

After acquiring the image data, an object space location of an imaged calibration feature may be determined based on a transformation from a calibration pattern coordinate system (e.g. coordinate system 316) to a coordinate system of eye-tracking camera 302 also based on the location of the calibration feature within the calibration pattern. As one example, the object space location $Z_{fi}$ of an $i^{th}$ imaged calibration feature in an image frame f may be represented as $Z_{fi} = \phi_f * X_i$, where $X_i$ is the location of the feature within the calibration pattern, and $\phi_f$ is a transformation from the calibration pattern coordinate system to the coordinate system of eye-tracking camera 302 in frame f. $X_i$ and $Z_{fi}$ each may be represented by a three-dimensional (x,y,z) coordinate, for example. The $\phi_f$ transformation may be determined via any suitable mechanism, such as those described above with which object space locations of imaged calibration features are determined. In some examples, calibration pattern 310 may be substantially flat, and as such the z-coordinates of the imaged calibration features $X_i$ within the calibration pattern may be fixed (e.g. set to zero).

The calibration procedure further includes, for an imaged calibration feature, determining a location of the imaged calibration feature in image space corresponding to the object space location of the imaged calibration feature in the eye-tracking camera coordinate system. As used herein, "image space" refers to a geometric extent corresponding to an image sensor with which image data is obtained. The image space may be represented by a two-dimensional (u,v) coordinate system 322, as one example.

FIG. 3 shows an image space location 324 where corner 314 is imaged by image sensor 320. The calibration procedure determines a mapping between image space location 324 and the corresponding object space location of corner 314. A plurality of analogous image space locations for other imaged calibration features may be determined, such that a mapping between image space locations across image sensor 320 and corresponding object space locations may be computed. As described below, a mapping between image space and object space may be computed on a per-pixel basis for pixels of image sensor 320, on a sub-pixel basis, or at any other suitable resolution.

Figure 4A:
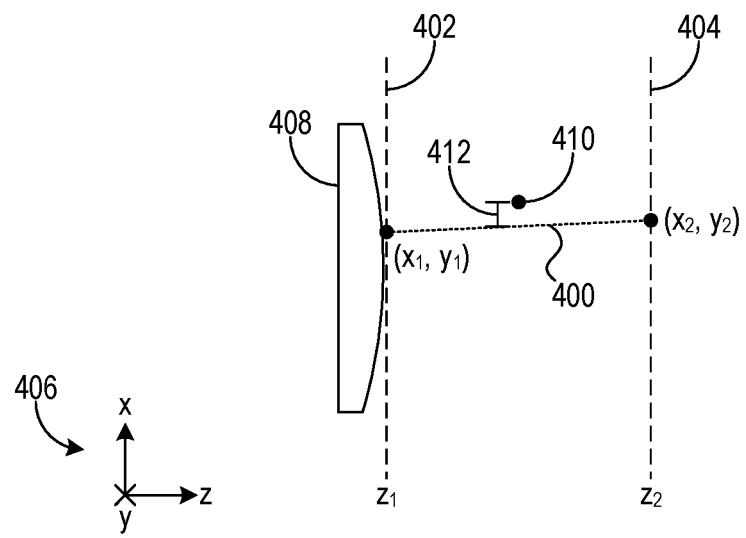
FIGS. 4A-4B show the fitting of an example ray of a ray-based camera model to an observed calibration feature.
Figure 4B:
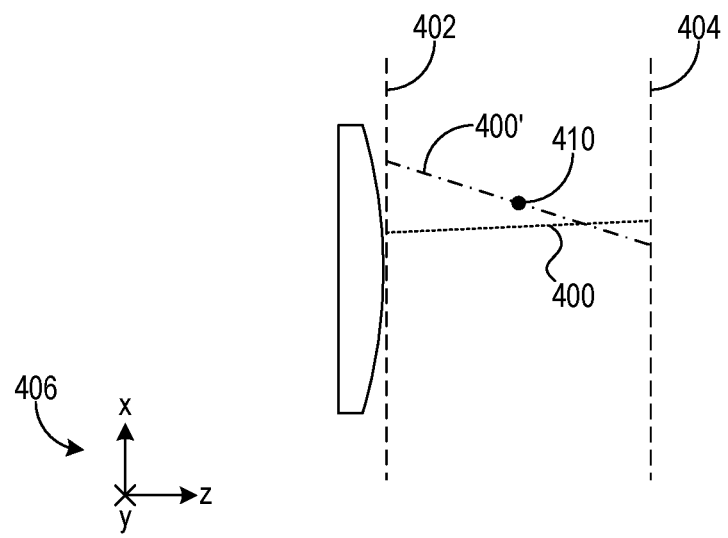

As mentioned above, the mapping between image space and object space is implemented via a camera model comprising a plurality of rays, with each ray defining a mapping between a location in image space on an image sensor and a location in object space. FIGS. 4A-4B illustrate a ray in an example camera model prior to and after fitting to an observed calibration feature in object space. In this camera model, each ray is defined as extending between a pair of fixed planes in object space. FIG. 4A shows an example ray 400 that extends between a first plane 402 and a second plane 404. With respect to an object space coordinate system 406, the first and second planes 402 and 404 are respectively located at first and second z-coordinates $z_1$ and $z_2$. Ray 400 may be represented by its endpoints, each of which may be encoded by a pair of two-dimensional coordinates—$(x_1, y_1)$ and $(x_2, y_2)$ respectively in this example. The z-coordinates of the endpoints of ray 400, being fixed to first and second planes 402 and 404, may be omitted. In other examples, other suitable representations of rays may be used, including those in which rays are encoded as a point and direction (e.g. for an optical system including a fisheye lens), or as 2D coordinates (e.g. azimuth and elevation) on a pair of spheres analogous to the pair of planes described above.

First and second planes 402 and 404 may be defined in any suitable manner. In FIGS. 4A-4B, first plane 402 is tangential to a center of lens 408 through which the camera being modeled views object space (e.g. lens 306 in eye-tracking camera 302), and second plane is located at an arbitrary position in object space. In other examples, the first plane and second plane may have any other suitable positions.

The camera model is calibrated by fitting the rays of the camera model to calibration features in object space imaged at the image space locations corresponding to the rays. In FIGS. 4A-4B, ray 400 corresponds to a location in image space at which an object space location 410, e.g. an imaged calibration feature, is observed. FIG. 4A represents the position of ray 400 prior to fitting, and illustrates an error in the form of a distance 412 separating ray 400 and object space location 410. Distance 412 may be determined, for example, according to the following formula:

$$D=(\|(x_1,y_1,z_1)-(x_2,y_2,z_2)) \times (Z-(x_2,y_2,z_2))\|)/(\|(x_1,y_1,z_1)-(x_2,y_2,z_2)\|) \quad (1)$$

where D is distance 412, $(x_1, y_1, z_1)$ is the set of coordinates of the endpoint of ray 400 at first plane 402, $(x_2, y_2, z_2)$ is the set of coordinates of the endpoint of the ray at second plane 404, and Z represents a set of coordinates (e.g. (x,y,z)) of object space location 410 of an imaged calibration feature.

To calibrate the camera model, the position of the ray is modified to reduce distance 412. FIG. 4B illustrates the position of ray 400' after the modification process. Here, one or more of the coordinates $(x_1, y_1, x_2, y_2)$ of ray 400 are modified such that distance 412 is reduced, yielding a modified ray 400' that intersects object space location 410. Thus, by representing the relationship between each image space location of the image sensor to object space with such rays and fitting the rays to observations of the calibration pattern, a calibrated camera model comprising the fitted rays is produced. In the depicted example, the modified ray 400' intersects the object space location 410 of the imaged calibration feature. However, in some instances, a modified ray may be moved closer to an associated object space location, but not intersect the object space location, when calibration is complete.

The rays of the camera model may be initialized in any suitable manner. As examples, each ray may be initialized by setting its (x,y) coordinates to zero or one. In other examples, suitable initialization values may be determined for a specific optical system based upon the optics of the system (e.g. to help the fitting converge more quickly).

Any suitable method may be used to fit the rays to observations in object space. In some examples, the fitting may be performed via defining a cost function that quantifies the distance D, and then reducing the cost function. As one example, the cost function may be defined such that its value is determined as a sum, over all image frames and all imaged calibration features of each image frame, of the distance between the object space location corresponding to the imaged calibration feature and the corresponding ray in the camera model. Then, one or more coordinates of each ray may be varied to reduce the cost function until the cost function meets a target condition. An example cost function and associated ray modification is described below.

To achieve a mapping from image space to object space, rays of the camera model may be represented by one or more functions from image space to object space. For examples in which rays are each represented by a four-dimensional coordinate $(x_1, y_1, x_2, y_2)$, each coordinate may be modeled by a respective function from image space to object space in the following manner: $x_1=f_1(u,v)$, $y_1=f_2(u,v)$, $x_2=f_3(u,v)$, and $y_2=f_4(u,v)$. The functions $f_1$, $f_2$, $f_3$, and $f_4$ map two-dimensional locations in image space to the four-dimensional coordinates that encode rays in object space, and may be collectively represented as a function $R(u,v)=[f_1(u,v), f_2(u,v), f_3(u,v), f_4(u,v)]$.

Functions used to represent rays of the camera model may assume any suitable form. In some examples, the functions may take the form of one or more splines that encode relationships between image space and object space. In one spline-based representation, bivariate B-splines may be used to encode such relationships. For an image space represented by image space coordinates (u,v) (e.g. coordinate system 322), a mapping from the image space to object space may be given by the following, for splines defined on a $T=M_u \times M_v$ grid:

$$R(u,v; \mathcal{R})=\Sigma_{i=1}^{M+k}\Sigma_{j=1}^{M+l}\beta_{i,k,T}(u)\beta_{j,l,T}(v)R[i][j] \quad (2)$$

In this example mapping, $\beta_{i,k,T}$, $\beta_{j,l,T}(v)$ are B-splines of order k and l, respectively, defined on segments $t_{ij} \in T$ with local support around the $i^{th}$ segment in a horizontal direction u and $j^{th}$ segment in a vertical direction v in image space. The control parameters $\mathcal{R}$ are an (M+k)×(M+l) array of four-dimensional vectors (four-vectors), wherein the vectors are four dimensional due to there being four unknowns $(x_1, y_1, x_2, y_2)$. The control parameters $\mathcal{R}$ may be related to the bold R in equation (2) according to the following relation: $\mathcal{R} =[R[i][j]$ for $1 \leq i \leq M+k, 1 \leq j \leq M+l]$.

Figure 5:
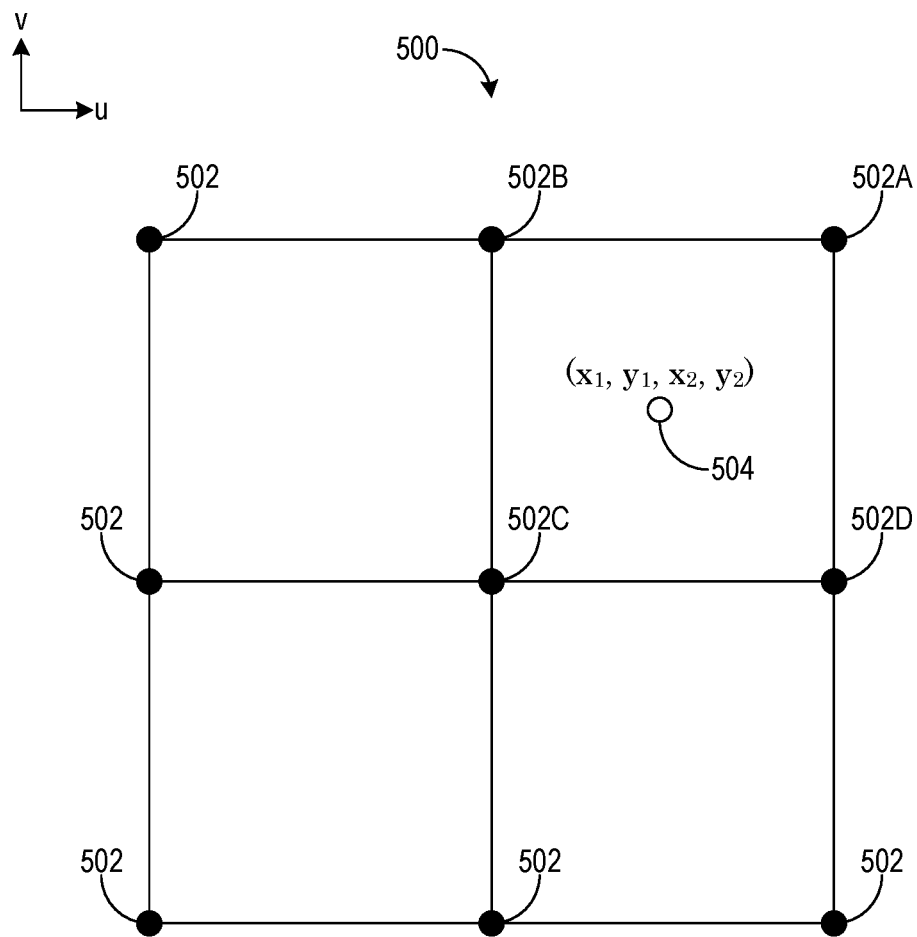
FIG. 5 illustrates an example spline-based representation of a camera model ray.

FIG. 5 schematically illustrates a spline-based representation of camera model rays in an image space coordinate system 500. Nine control points 502 are defined in a 3×3 grid, where the control points are used to define a B-spline interpolation of an image. A four-vector may be associated with any point on the image, such as point 504, which is associated with a four-vector comprising coordinates $(x_1, y_1, x_2, y_2)$ that represent a ray (e.g. ray 400). This four-vector may be computed by evaluating a sum of B-splines evaluated at point 504. More specifically, each coordinate of the four-vector may be determined by summing the product of B-splines evaluated at the point 504 of interest and scaled by spline coefficients R associated with the B-splines, where the summation may be over two indices i and j, from i to M+k, and from j to M+l. As a particular example in which the B-splines are of order two in both the horizontal u and vertical v directions, 5×5×4 spline coefficients R may be associated with the B-splines defined for the 3×3 grid. The coordinate $x_1$ for point 504 (e.g. an image space location) may then be determined in the following manner:

$$x_1=\Sigma_1^5\Sigma_1^5 R_{ij1}\beta_i\beta_j \quad (3)$$

Similarly, the coordinate $y_1$ for point 504 may be determined in the following manner:

$$y_1=\Sigma_1^5\Sigma_1^5 R_{ij2}\beta_i\beta_j \quad (4)$$

Other coordinates for point 504, and other points in the image, may be similarly determined to calibrate the rays of the spline-based camera model. In this example, mappings from image space to object space may be obtained with subpixel accuracy, and thus may yield a more accurately calibrated camera model. Further, this representation may be used in connection with the calibration of an image sensor without requiring that a calibration feature be imaged at every pixel of the image sensor, or that different pixels image the same calibration feature.

In a spline-based camera model, the camera model may be adjusted by adjusting one or more parameters associated with the splines used to represent the rays therein. In the examples described above, the control parameters $\mathcal{R}$ may be modified as part of this adjustment. A suitable number of control parameters may be associated with splines, depending upon the choice of image segmentation T and order of the splines. As an example for an image sensor that collects image frames of size 640 pixels by 480 pixels, a set of control parameters on the order of 100 may be associated with second order splines with 3×3 image segmentation.

As described above, camera model rays may be modified in the course of reducing a cost function. For a spline-based camera model, the cost function may be defined by:

$$E(\mathcal{R})=\Sigma_f\Sigma_i D(R(u_{fi}; \mathcal{R}), Z_{fi}) \quad (5)$$

where E($\mathcal{R}$) is the value of the cost function summed over every frame f of image of image data and over every imaged calibration feature i, D is a function that computes the distance between a ray R($u_{fi}$; $\mathcal{R}$) (associated with the $f^{th}$ frame and $i^{th}$ imaged calibration feature, mapping from an image space location $u_{fi}$, and associated with control parameters $\mathcal{R}$) and a corresponding object space location $Z_{fi}$. As described above, this cost function may be reduced until the value of the cost function meets a target condition by modifying one or more control parameters $\mathcal{R}$. Once the cost function meets the target condition, the calibration of the camera model is complete, and the calibrated model may be used in a machine vision application, such as eye tracking.

Figure 6:
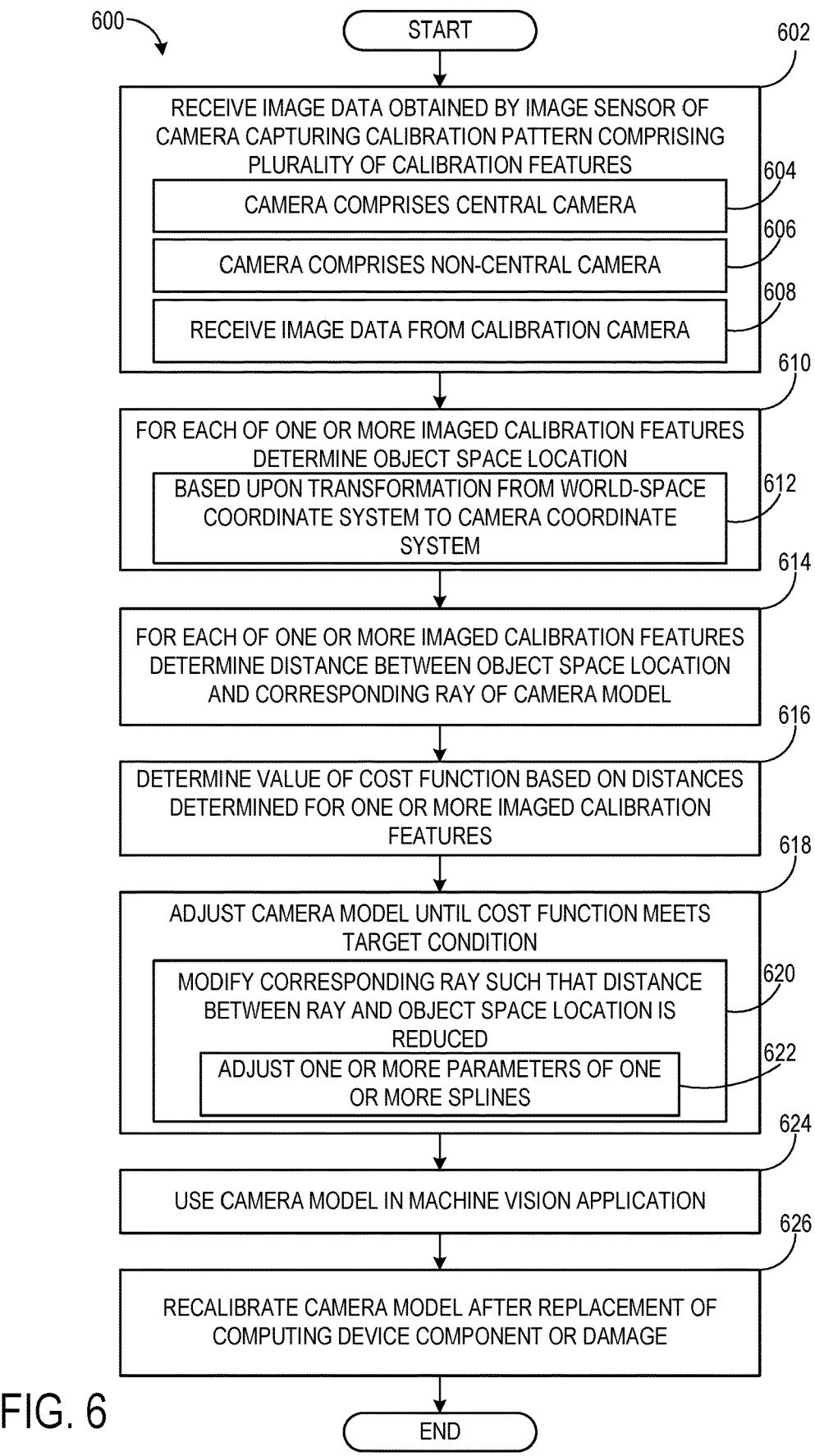
FIG. 6 shows a flowchart illustrating an example method of calibrating a camera.

FIG. 6 shows a flowchart illustrating an example method 600 of using a camera model in a machine vision application. At 602, method 600 includes receiving image data (e.g., a plurality of images) obtained by an image sensor of a camera, the image data capturing a calibration pattern comprising a plurality of calibration features. In some examples, the camera may comprise a central camera 604. In some examples, the camera may comprise a non-central camera 606 (e.g. camera 302 in FIG. 3). Further, in some examples, a calibration camera separate from the camera being calibrated (e.g. camera 318 in FIG. 3) also is used to image the calibration pattern to help determine a position of the calibration pattern in object space. As such, method 600 may comprise, at 608, receiving image data from a calibration camera.

For examples in which image data is received from a calibration camera, method 600 includes at 610, for each of one or more imaged calibration features in the image data, determining an object space location of the imaged calibration feature. The object space location may be determined based upon a transformation 612 from a calibration pattern coordinate system to a coordinate system of the camera. In examples where a calibration camera is not used, such transformations and object space locations may be determined along with the camera ray parameters determined as part of the calibration of a camera model.

At 614, method 600 includes, for each of one or more imaged calibration features in the image data, determining a distance between the object space location and a corresponding ray of a camera model, the camera model defining a plurality of rays that each represent a relationship of an image space location of a pixel on the image sensor to object space.

At 616, method 600 includes determining a value of a cost function based on the distances determined for the one or more imaged calibration features. At 618, method 600 includes adjusting the camera model (e.g. by moving one or more of the rays) until the cost function meets a target condition. Adjusting the camera model may include modifying 620 the corresponding ray such that the distance between the object space location and the corresponding ray is reduced. Adjustments of the camera model may be done by adjusting 622 one or more parameters of one or more splines that encode the relationship of an image space location to object space.

At 624, method 600 includes using the camera model in a machine vision application. The machine vision application may include eye-tracking, as one example.

In some instances, as described above, a machine vision camera may require recalibration. For example, various computing device parts may require replacement over the lifetime of a computing device that uses machine vision, or impacts or other sudden motion may impact a prior calibration. As examples, the component may be an optical element associated with the acquisition of the image data and/or with the machine vision application, such as a lens in an HMD device. Other conditions may prompt recalibration, including but not limited to user inputs requesting recalibration and sensor input indicating a misalignment or other physical change in the computing device. As such, at 626, method 600 includes recalibrating the camera model after replacement of a component of the computing device or damage to the computing device. In some examples, a recalibration pattern may be printed on a physical surface or displayed on an external display device and moved throughout the field of view of the camera being recalibrated, as described above for the initial calibration process. In another example in which an eye-tracking camera is recalibrated, the eye-tracking system may be recalibrated based on image data capturing images of\ a user's eye(s) as the user's gaze assumes different directions. The user may be directed to gaze at different image space locations in a recalibration pattern rendered on a display, for example. The recalibration pattern may assume any suitable form, such as a grid of regularly spaced calibration features.

In some embodiments, the methods and processes described herein may be tied to a computing system of one or more computing devices. In particular, such methods and processes may be implemented as a computer-application program or service, an application-programming interface (API), a library, and/or other computer-program product.

Figure 7:
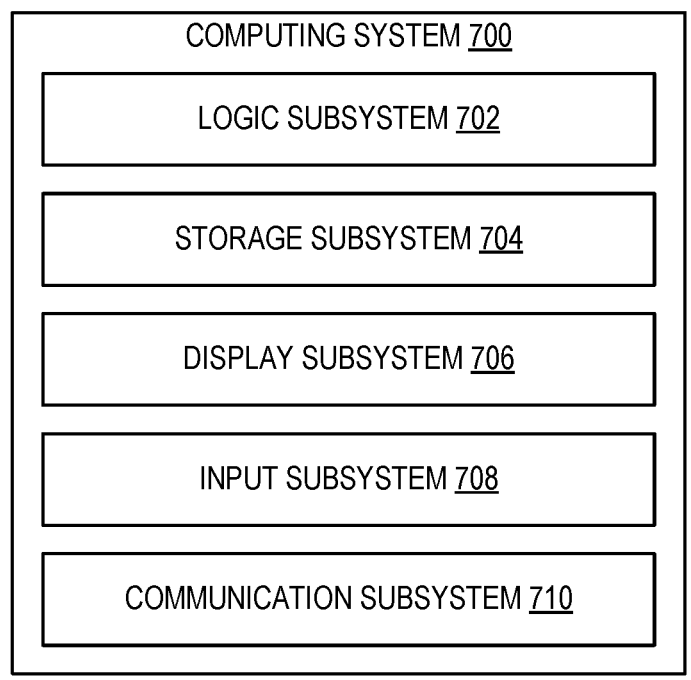
FIG. 7 schematically shows an example computing system.

FIG. 7 schematically shows a non-limiting embodiment of a computing system 700 that can enact one or more of the methods and processes described above. Computing system 700 is shown in simplified form. Computing system 700 may take the form of one or more personal computers, server computers, tablet computers, home-entertainment computers, network computing devices, gaming devices, mobile computing devices, mobile communication devices (e.g. smart phone), and/or other computing devices.

Computing system 700 includes a logic machine 702 and a storage machine 704. Computing system 700 may optionally include a display subsystem 706, input subsystem 708, communication subsystem 710, and/or other components not shown in FIG. 7.

Logic machine 702 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 704 includes one or more physical devices configured to hold instructions executable by the logic machine to implement the methods and processes described herein. When such methods and processes are implemented, the state of storage machine 704 may be transformed—e.g. to hold different data.

Storage machine 704 may include removable and/or built-in devices. Storage machine 704 may include optical memory (e.g. CD, DVD, HD-DVD, Blu-Ray Disc, etc.), semiconductor memory (e.g. RAM, EPROM, EEPROM, etc.), and/or magnetic memory (e.g. hard-disk drive, floppy-disk drive, tape drive, MRAM, etc.), among others. Storage machine 704 may include volatile, nonvolatile, dynamic, static, read/write, read-only, random-access, sequential-access, location-addressable, file-addressable, and/or content-addressable devices.

It will be appreciated that storage machine 704 includes one or more physical devices. However, aspects of the instructions described herein alternatively may be propagated by a communication medium (e.g. an electromagnetic signal, an optical signal, etc.) that is not held by a physical device for a finite duration.

Aspects of logic machine 702 and storage machine 704 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program" may be used to describe an aspect of computing system 700 implemented to perform a particular function. In some cases, a program may be instantiated via logic machine 702 executing instructions held by storage machine 704. It will be understood that different programs may be instantiated from the same application, code block, object, library, routine, API, function, etc. Likewise, the same program may be instantiated by different applications, code blocks, objects, routines, APIs, functions, etc. The term "program" may encompass individual or groups of executable files, data files, libraries, drivers, scripts, database records, etc.

When included, display subsystem 706 may be used to present a visual representation of data held by storage machine 704. This visual representation may take the form of a graphical user interface (GUI). As the herein described methods and processes change the data held by the storage machine, and thus transform the state of the storage machine, the state of display subsystem 706 may likewise be transformed to visually represent changes in the underlying data. Display subsystem 706 may include one or more display devices utilizing virtually any type of technology. Such display devices may be combined with logic machine 702 and/or storage machine 704 in a shared enclosure, or such display devices may be peripheral display devices.

When included, input subsystem 708 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 710 may be configured to communicatively couple computing system 700 with one or more other computing devices. Communication subsystem 710 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 700 to send and/or receive messages to and/or from other devices via a network such as the Internet.

Another example provides a computing device comprising a logic machine and a storage machine comprising instructions executable by the logic machine to receive image data obtained by an image sensor of a camera, the image data capturing a calibration pattern comprising a plurality of calibration features, for each of one or more imaged calibration features in the image data, determine an object space location of the imaged calibration feature, and determine a distance between the object space location and a corresponding ray of a camera model, the camera model defining a plurality of rays that each represent a relationship of an image space location on the image sensor to object space, determine a value of a cost function based on the distances determined for the one or more imaged calibration features, adjust the camera model until the cost function meets a target condition, and use the camera model in a machine vision application. In such an example, the image data may comprise a plurality of images. In such an example, the camera may be a part of a non-central imaging system. In such an example, the camera alternatively or additionally may be positioned to receive light refracted through a lens. In such an example, the instructions executable to use the camera model in the machine vision application may be implemented by an eye-tracking system. In such an example, each ray of the plurality of rays may be defined by four coordinates. In such an example, the storage machine additionally may comprise instructions executable to recalibrate the camera model after one or more of damage to the computing device and replacement of a part of the computing device. In such an example, the instructions executable to adjust the camera model alternatively or additionally may be executable to modify the corresponding ray such that the distance between the object space location and the corresponding ray is reduced. In such an example, the relationship of the image space location to object space may be encoded by one or more splines. In such an example, the instructions executable to adjust the camera model alternatively or additionally may be executable to adjust one or more parameters of the one or more splines. In such an example, the object space location may be determined based upon a transformation from a calibration pattern coordinate system to a coordinate system of the camera.

Another example provides, at a computing device, a method, comprising receiving image data obtained by an image sensor of a camera, the image data capturing a calibration pattern comprising a plurality of calibration features, for each of one or more imaged calibration features in the image data, determining an object space location of the imaged calibration feature, and determining a distance between the object space location and a corresponding ray of a camera model, the camera model defining a plurality of rays that each represent a relationship of an image space location on the image sensor to object space, determining a value of a cost function based on the distances determined for the one or more imaged calibration features, and adjusting the camera model until the cost function meets a target condition. In such an example, the camera model may be used by an eye-tracking system. In such an example, each ray of the plurality of rays may be defined by four coordinates. In such an example, the method may further comprise readjusting the camera model based upon a recalibration pattern after one or more of damage to the computing device and replacement of a part of the computing device. In such an example, adjusting the camera model alternatively or additionally may comprise modifying the corresponding ray such that the distance between the object space location and the corresponding ray is reduced. In such an example, the relationship of the image space location to object space may be encoded by one or more splines. In such an example, adjusting the camera model alternatively or additionally may comprise adjusting the camera model on a subpixel scale.

Another example provides a head-mounted display device, comprising a camera comprising an image sensor, a logic machine, and a storage machine comprising instructions executable by the logic machine to, via the camera, obtain image data capturing a calibration pattern comprising a plurality of calibration features, for each of one or more imaged calibration features in the image data, determine an object space location of the imaged calibration feature, determine a distance between the object space location and a corresponding ray of a camera model, the camera model defining a plurality of rays that each represent a relationship of an image space location on the image sensor to object space, determine a value of a cost function based on the distances determined for the one or more imaged calibration features, adjust the camera model until the cost function meets a target condition, use the camera model in a machine vision application, and recalibrate the camera model after one or more of damage to the head-mounted display device and replacement of a part of the head-mounted display device. In such an example, the instructions alternatively or additionally may be executable to recalibrate the camera model based on capturing images of a recalibration pattern and fitting one or more rays of the camera model to observations of calibration features in the recalibration pattern.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device, comprising:
   a logic machine; and
   a storage machine comprising instructions executable by the logic machine to
      receive image data obtained by an image sensor of a camera, the image data capturing a calibration pattern comprising a plurality of calibration features
      for each of a plurality of imaged calibration features in the image data,
         determine an object space location of the imaged calibration feature;
         determine a location of the imaged calibration feature in image space; and
         determine a distance between the object space location of the imaged calibration feature and a corresponding ray of a camera model corresponding to the location of the imaged calibration feature in image space, the camera model defining a plurality of rays that each represents a relationship of an image space location on the image sensor to object space, and each ray comprising a first coordinate at a first distance from the image sensor and a second coordinate at a second distance from the image sensor;
      determine a value of a cost function based on the distances determined for the plurality of imaged calibration features;
      for each imaged calibration feature, fit the corresponding ray to the object space location of the imaged calibration feature by varying one or more of the first coordinate and the second coordinate for the corresponding ray to adjust the camera model until the cost function meets a target condition; and
      use the camera model in a machine vision application.

2. The computing device of claim 1, wherein the image data comprises a plurality of images.

3. The computing device of claim 1, wherein the camera is a part of a non-central imaging system.

4. The computing device of claim 3, wherein the camera is positioned to receive light refracted through a lens.

5. The computing device of claim 1, wherein the instructions executable to use the camera model in the machine vision application are implemented by an eye-tracking system.

6. The computing device of claim 1, wherein, for each ray of the plurality of rays, the first coordinate comprises a first (x,y) coordinate and the second coordinate comprises a second (x,y) coordinate.

7. The computing device of claim 1, further comprising instructions executable to recalibrate the camera model after one or more of damage to the computing device and replacement of a part of the computing device.

8. The computing device of claim 1, wherein the instructions executable to adjust the camera model are executable to modify the corresponding ray such that the distance between the object space location of the imaged calibration feature and the corresponding ray is reduced.

9. The computing device of claim 1, wherein the relationship of the image space location to object space is encoded by one or more splines.

10. The computing device of claim 9, wherein the instructions executable to adjust the camera model are executable to adjust one or more parameters of the one or more splines.

11. The computing device of claim 1, wherein the object space location of the imaged calibration feature is determined based upon a transformation from a calibration pattern coordinate system to a coordinate system of the camera.

12. At a computing device, a method, comprising:
   receiving image data obtained by an image sensor of a camera, the image data capturing a calibration pattern comprising a plurality of calibration features;
   for each of a plurality of imaged calibration features in the image data,
      determining an object space location of the imaged calibration feature, determining a location of the imaged calibration feature in image space, and determining a distance between the object space location of the imaged calibration feature and a corresponding ray of a camera model corresponding to the location of the imaged calibration feature in image space, the camera model defining a plurality of rays that each represents a relationship of an image space location on the image sensor to object space, and each ray comprising a first coordinate at a first distance from the image sensor and a second coordinate at a second distance from the image sensor;

determining a value of a cost function based on the distances determined for the plurality of imaged calibration features; and for each imaged calibration feature, fitting the corresponding ray to the object space location of the imaged calibration feature by varying one or more of the first coordinate and the second coordinate for the corresponding ray to adjust the camera model until the cost function meets a target condition.

13. The method of claim 12, wherein the camera model is used by an eye-tracking system.

14. The method of claim 12, wherein, for each ray of the plurality of rays, the first coordinate comprises a first (x,y) coordinate and the second coordinate comprises a second (x,y) coordinate.

15. The method of claim 12, further comprising readjusting the camera model based upon a recalibration pattern after one or more of damage to the computing device and replacement of a part of the computing device.

16. The method of claim 12, wherein adjusting the camera model comprises modifying the corresponding ray such that the distance between the object space location of the imaged calibration feature and the corresponding ray is reduced.

17. The method of claim 12, wherein the relationship of the image space location to object space is encoded by one or more splines.

18. The method of claim 17, wherein adjusting the camera model comprises adjusting the camera model on a subpixel scale.

19. A head-mounted display device, comprising:
a camera comprising an image sensor;
a logic machine; and
a storage machine comprising instructions executable by the logic machine to
via the camera, obtain image data capturing a calibration pattern comprising a plurality of calibration features;
for each of a plurality of imaged calibration features in the image data,
determine an object space location of the imaged calibration feature;
determine a location of the imaged calibration feature in image space;
determine a distance between the object space location of the imaged calibration feature and a corresponding ray of a camera model corresponding to the location of the imaged calibration feature in image space, the camera model defining a plurality of rays that each represent a relationship of an image space location on the image sensor to object space, and each ray comprising a first coordinate at a first distance from the image sensor and a second coordinate at a second distance from the image sensor;
determine a value of a cost function based on the distances determined for the plurality of imaged calibration features;
for each imaged calibration feature, fit the corresponding ray to the object space location of the imaged calibration feature by varying one or more of the first coordinate and the second coordinate for the corresponding ray to adjust the camera model until the cost function meets a target condition;
use the camera model in a machine vision application; and
recalibrate the camera model after one or more of damage to the head-mounted display device and replacement of a part of the head-mounted display device.

20. The head-mounted display device of claim 19, wherein the instructions are executable to recalibrate the camera model based on capturing images of a recalibration pattern and fitting one or more rays of the camera model to observations of calibration features in the recalibration pattern.

* * * * *